US009500125B2

(12) United States Patent
Groenhuijzen et al.

(10) Patent No.: US 9,500,125 B2
(45) Date of Patent: Nov. 22, 2016

(54) COMBUSTION PRESSURE MEASURING PLUG FOR A COMBUSTION ENGINE

(71) Applicants: Serge Groenhuijzen, Borne (NL); Johan Te Riet, Hengelo (NL); Jan-Willem Sloetjes, Wierden (NL)

(72) Inventors: Serge Groenhuijzen, Borne (NL); Johan Te Riet, Hengelo (NL); Jan-Willem Sloetjes, Wierden (NL)

(73) Assignee: Sensata Technologies, Inc., Attleboro, MA (US)

( * ) Notice: Subject to any disclaimer, the term of this patent is extended or adjusted under 35 U.S.C. 154(b) by 243 days.

(21) Appl. No.: 14/286,617

(22) Filed: May 23, 2014

(65) Prior Publication Data

US 2014/0352415 A1    Dec. 4, 2014

(30) Foreign Application Priority Data

May 28, 2013   (EP) ..................................... 13169547

(51) Int. Cl.
| | | |
|---|---|---|
| *G01M 15/08* | (2006.01) | |
| *F02B 77/08* | (2006.01) | |
| *G01L 19/00* | (2006.01) | |
| *G01L 19/14* | (2006.01) | |
| *G01L 23/18* | (2006.01) | |
| *F23Q 7/00* | (2006.01) | |

(52) U.S. Cl.
CPC ......... *F02B 77/085* (2013.01); *G01L 19/0084* (2013.01); *G01L 19/148* (2013.01); *G01L 23/18* (2013.01); *F23Q 2007/002* (2013.01)

(58) Field of Classification Search
USPC .............................. 73/114.16, 114.18, 114.19
See application file for complete search history.

(56) References Cited

U.S. PATENT DOCUMENTS

| | | | | |
|---|---|---|---|---|
| 8,109,250 | B2 * | 2/2012 | Ramond ................. | G01L 23/22 123/143 R |
| 2002/0189334 | A1 * | 12/2002 | Ford ....................... | G01L 23/22 73/114.19 |
| 2004/0182145 | A1 * | 9/2004 | Okazaki ................. | F02P 19/028 73/114.18 |
| 2005/0061063 | A1 * | 3/2005 | Haussner ................ | F23Q 7/001 73/114.18 |

(Continued)

*Primary Examiner* — Eric S McCall
(74) *Attorney, Agent, or Firm* — Chapin Intellectual Property Law, LLC

(57) ABSTRACT

Disclosed is a pressure-measuring plug (100) for a combustion engine comprising a hollow plug body (102), a housing (110) attached to a distal end (102D) of the plug body (102), electronic components (116) arranged in the housing (110) and a sensing module (104) arranged in the hollow plug body and attached to a proximal end (102P) of the hollow plug body (102) The measuring plug further comprises an interconnection module (108) configured to electrically connect the electronic components (116) to the sensing module (104) through the hollow plug body. The interconnection module (108) comprises an elongated support structure (108A) with a first end (108P) provided with first terminals (108C) and a second end (108D) provided with second terminals (108B1), wherein the first terminals (108C) provide an electrical coupling which is flexible in axial direction. The interconnection module provides a reliable connection and could be used for mass production.

14 Claims, 4 Drawing Sheets

(56) References Cited

U.S. PATENT DOCUMENTS

| | | | |
|---|---|---|---|
| 2005/0150301 A1* | 7/2005 | Skinner | F02P 19/028 73/714 |
| 2006/0053875 A1* | 3/2006 | Haussner | F23Q 7/001 73/114.19 |
| 2006/0218997 A1* | 10/2006 | Yamada | F23Q 7/001 73/114.21 |
| 2008/0216786 A1* | 9/2008 | Ramond | G01L 23/22 123/143 A |
| 2009/0320576 A1* | 12/2009 | Borgers | G01L 23/18 73/114.18 |
| 2010/0147822 A1* | 6/2010 | Burrows | F23Q 7/001 219/267 |
| 2011/0101844 A1* | 5/2011 | Glaser | F02D 35/023 313/141 |

* cited by examiner

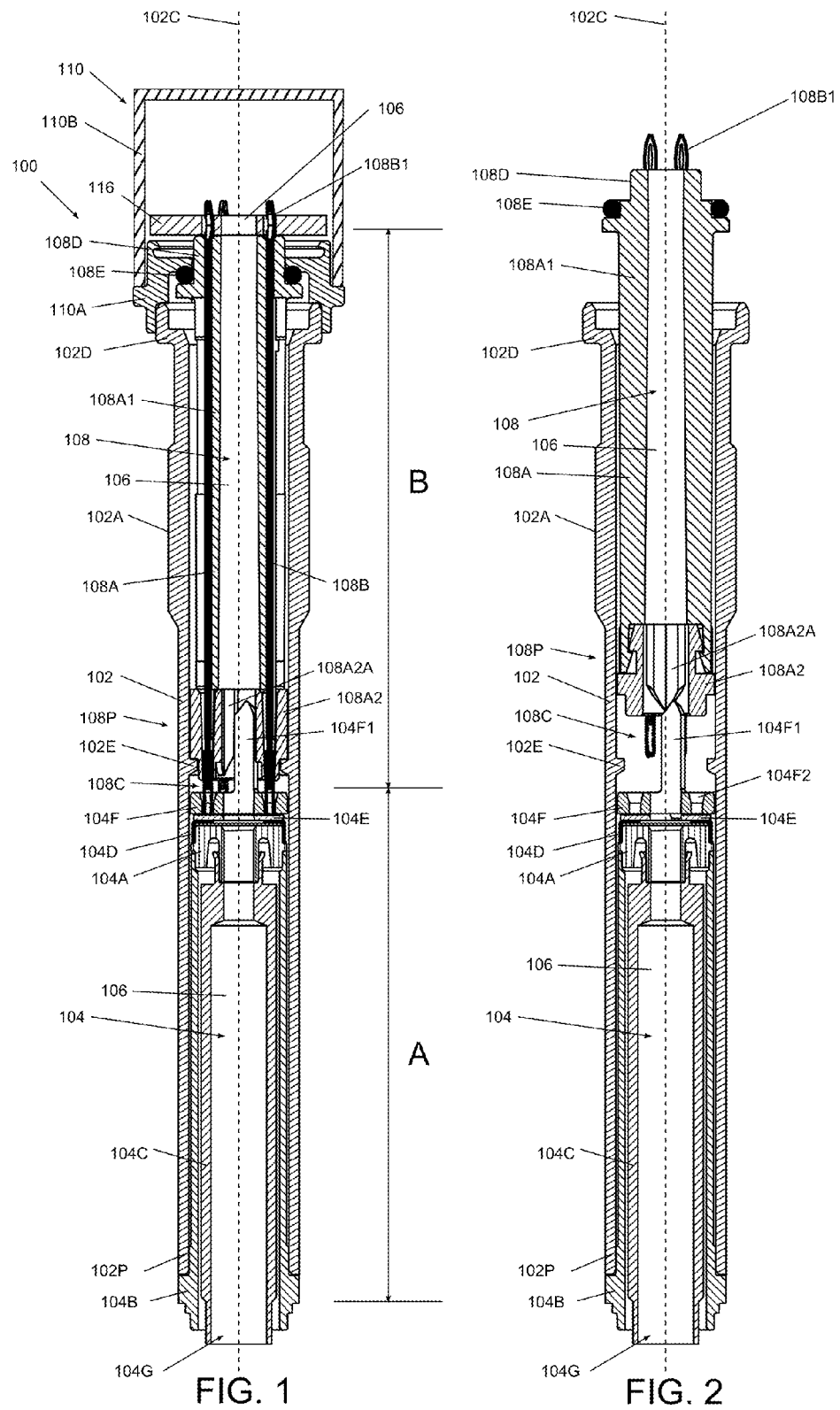

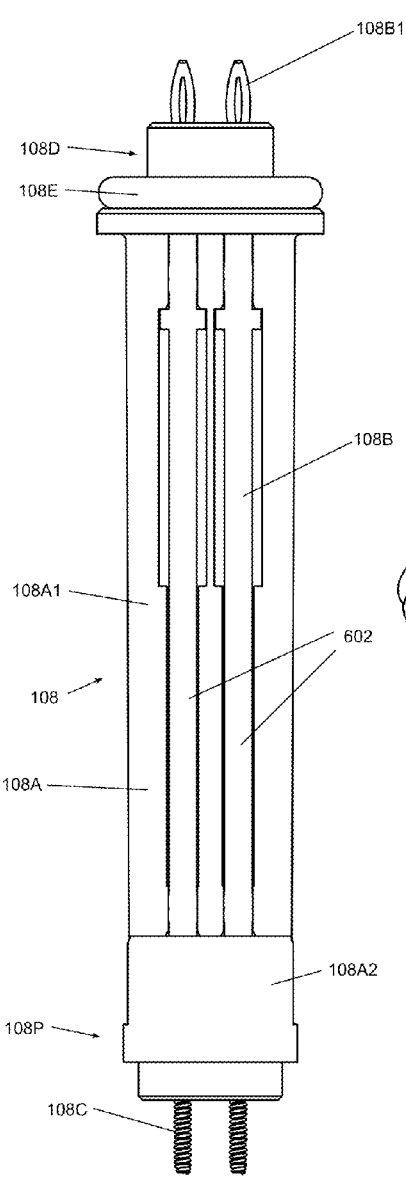
FIG. 3
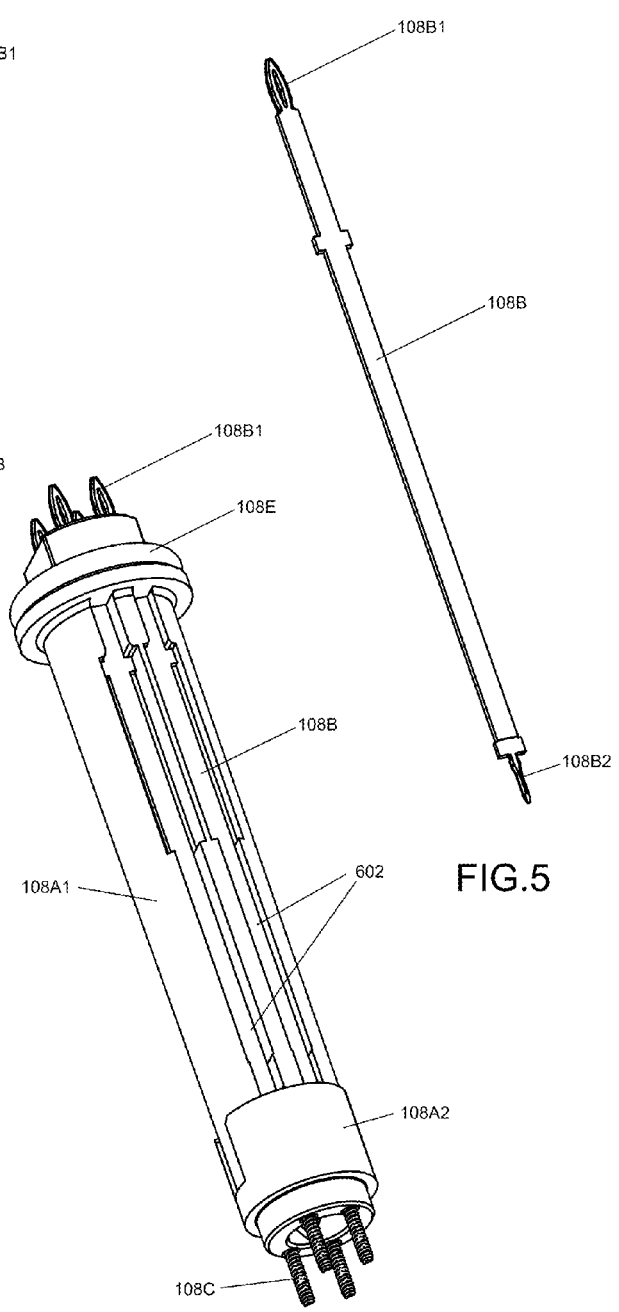
FIG.4
FIG.5

COMBUSTION PRESSURE MEASURING PLUG FOR A COMBUSTION ENGINE

CROSS REFERENCE TO RELATED APPLICATION

This application claims priority to European Patent Application No. 13169547.0, filed May 28, 2013.

TECHNICAL FIELD

The invention relates to a measuring plug and a method for assembling a measuring plug. More particularly, the invention relates to a piezo-resistive pressure-measuring plug for a combustion engine.

BACKGROUND ART

Advanced combustion strategies for gasoline engines in the future depend on the existence of accurate pressure feedback from each combustion cylinder during the entire cycle (compression—combustion—exhaust cycle). These strategies may or may not include Homogeneous Charge Compression Ignition (HCCI) combustion, and can result in high pressure release rates which require fast and accurate pressure response.

A piezo-resistive pressure-measuring plug is known from EP2138819A1. The pressure-measuring plug comprises a very small sensing element that can be placed near the combustion side and therefore a very high bandwidth sensor is feasible. By means of bonding wires, the sensing elements are electrically coupled with sensor electronics on a printed wiring board (PWB) which is located in the plug body. The sensor electronics is arranged to measure a resistance change of the piezo-resistive elements mounted on a sensing module and to generate a conditioned measurement signal therefrom. It has been found that the temperatures inside the body do not allow using a conventional PWB with standard components. Consequently, to obtain a reliable measuring plug, more expensive parts have to be used.

SUMMARY OF INVENTION

It is an object of the present invention to provide an improved measuring plug with a structure which protects the conditioning electronics from thermal overload. Another object of the invention to provide a pressure measuring plug which is at least one of: reliable, cheaper to manufacture, producible in high volume by means of semi- or full automatic production processes, long lasting and/or robust to harsh pressure media, withstanding the high temperature and vibration typical of an internal combustion engine.

According to a first aspect of the invention, this object is achieved by a measuring plug having the features of claim 1. Advantageous embodiments and further ways of carrying out the invention may be attained by the measures mentioned in the dependent claims.

A measuring plug according to the invention comprises a hollow plug body, a housing, a sensing module and electronic components, for example connectors. The hollow plug body comprises a proximal end and a distal end. The hollow plug body further comprises a plug body axis. The housing is attached to the distal end of the plug body. The electronic components are arranged in the housing. The sensing module is arranged in the hollow plug body and comprises at least one electrical sensing element and a PWB. The PWB is electrically coupled to the at least one electrical sensing element. Furthermore, the sensing module is attached to the proximal end of the hollow plug body. The measuring plug further comprises an interconnection module configured to electrically connect the electronic components to the sensing module through the hollow plug body. The interconnection module comprises an elongated support structure with a first end and a second end. The first end and the second end are provided with first terminals and second terminals, respectively. The first terminals provide an electrical coupling which is flexible in axial direction of the hollow plug body. In an embodiment the first terminals are spring type terminals. In an advantageous embodiment, the sensing module is configured to measure pressure in a combustion chamber.

These features provide an electrical interconnection between a sensing module in the hollow plug body and electronics in the housing which can connect over a total distance of at least 100 mm. The interconnection can be made after the sensing module is attached to the hollow plug body. The spring type terminals provide a reliable electrical connection in the plug body which can withstand automotive engine temperature and vibration requirements. The interconnection module is inserted in the hollow plug body after the sensing module is attached at one end of the hollow plug body. While the interconnection module is inserted in the hollow plug body, the terminals of the interconnection module will make electrical contact with contact areas of the sensing module. This modular construction allows high volume assembly. The flexibility of the connection in axial direction allows using a material for the elongated support structure with a coefficient of thermal expansion which differs from the coefficient of thermal expansion of the hollow plug body. The difference in expansion is compensated by the flexible coupling. Furthermore, the flexible coupling in axial direction allows compensating variations in the length of the hollow plug body, interconnection module and sensing module In an embodiment, each spring type terminal includes a helical compression spring. In an advantageous embodiment, the helical compression spring comprises a spring axis which is parallel to the plug body axis. Automotive applications have a large operating temperature range. As components are used with different coefficient of thermal expansion, stress in the electrical connection between sensing module and interconnection module should be avoided. This feature provides a reliable electrical connection which compensates variations in distance between modules due to temperature variations and vibrations.

In an embodiment, the PWB of the sensing module comprises a number of contact areas which are in a plain perpendicular to the plug body axis. The first terminals are touching the number of contact areas. These features allow to slide the interconnection module and to make a reliable connection between sensing module and interconnection module. Furthermore, this feature reduces the complexity of the manufacturing process of the measuring plug.

In an embodiment, the second terminals are a press fit terminals. The combination of press fit terminal at one side of the interconnection module and spring type terminals at the opposite side of the interconnection module provide a cost effective solution to make a reliable electrical connection at both sides of the interconnection module.

In an embodiment, the sensing module further comprises an alignment element. The PWB of the sensing module is located in axial direction of the plug body between the at least one electrical sensing element and the alignment element. The gal dam is configured to hold together a protective gel which covers the electrical sensing elements to protect them against corrosion. The alignment element and an end of the elongated support structure of the interconnection module comprise cooperating alignment structures configured to align the interconnection module with respect to the PWB. These features allow blind insertion of the interconnection module in the hollow plug body. In an advantageous embodiment, the alignment structure of the alignment element comprises two or more arrow-shaped structures having a tip pointing in the direction of the housing.

In an embodiment, the interconnection module comprises conductive strip-like elements. A first end of the strip-like elements forms at least a part of a first terminal. A second end of the strip-like elements forms a second terminal. The elongated support structure comprises longitudinal recesses parallel to the plug body axis and configured to receive the strip-like elements. These features provide an interconnection module which is cost effective and easy to be manufactured in high volume.

In a further embodiment, a longitudinal recess terminates in a through hole at the distal end of the elongated support structure. Both the elongated recesses and stripe-like elements comprise a structure which narrows in the direction of the distal end. These features prevents that the stripe-like elements can move in axial direction in a longitudinal recess.

In an embodiment, the interconnection module has a rotational symmetric structure. This feature provides an interconnection module which has more than one possible placement in the hollow plug body to provide a reliable electrical connection through the hollow plug body.

In an embodiment, the interconnection module has been obtained by an overmolding process. An overmolding process allows reducing the manufacturing costs for high volumes.

In an embodiment, the hollow plug body internally comprises a protrusion which defines the position of the proximal end of the interconnection module in the hollow plug body in a direction along the plug body axis. This feature reduces the variation in distance between proximal end of the interconnection module and PWB of the sensing module due to temperature changes.

In a further embodiment, the interconnection module further comprises a resilient O-ring at an end of the interconnection module located at the distal end of the hollow plug body. The combination of protrusion in the hollow plug body and O-ring secures the interconnection module in axial direction in the hollow plug body. Furthermore, the O-ring reduces the amount of stress in the interconnection structure due to different coefficient of thermal expansion of the hollow plug body and the elongated support structure of the interconnection structure.

In an embodiment, the sensing module and the interconnection structure comprises a central through hole configured for passing through the hollow plug body an electrical connection of an electrical element attached in the central through hole of the sensing module to the housing. This feature allows combining the measuring plug with another function at the proximal end of the hollow plug body which requires also an electrical connection through the hollow plug body. In an embodiment, the electrical element is a glow rod.

In a second aspect there is provided a method of assembling a measuring plug. The method comprises:
 providing an assembly of sensing module and hollow plug body, a PWB of the sensing module is located at distance of an open end of the hollow plug body; and,
 sliding the interconnection module in the hollow plug body to make an electrical connection between interconnection module and PWB of the sensing module.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which:

FIG. 1 shows schematically a sectional view of an embodiment of a pressure-measuring plug;

FIG. 2 shows schematically a sectional view of the embodiment in FIG. 1 when sliding the interconnection module in the hollow plug body;

FIG. 3 shows schematically a side view of the interconnection module in FIG. 1;

FIG. 4 shows a perspective view of the interconnection module;

FIG. 5 shows a perspective view of a conductor for use in the interconnection module;

DESCRIPTION OF EMBODIMENTS

Figures 6, 7, 8, 9:
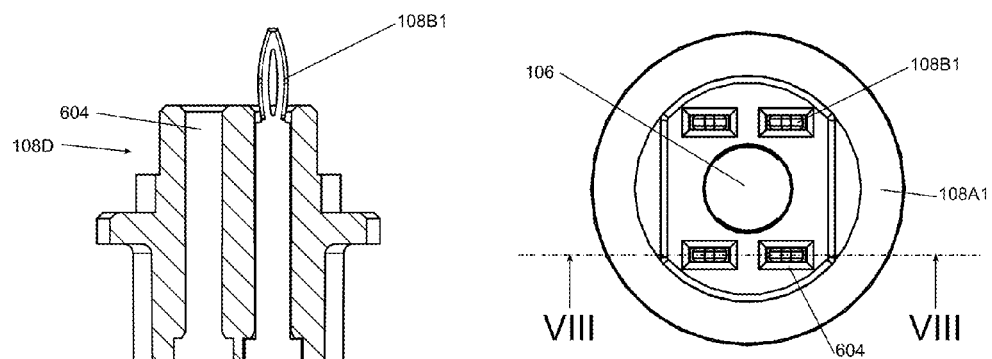
FIG. 6 shows a top view of the interconnection module.
FIG. 7 shows a bottom view of the interconnection module.
FIG. 8 shows schematically a sectional view of the interconnection module along the line VIII-VIII in FIGS. 6 and 7.
FIG. 9 shows a top view of the sensing module.

FIG. 1 shows schematically a sectional view of an embodiment of a Pressure-measuring plug 100 for a combustion engine. The pressure-measuring plug 100 comprises a hollow plug body 102, a sensing module 104, an interconnection module 108, electronic circuitry 116 and a housing 110. The housing 110 is provided with a hexagonal periphery (not shown) to enable the mounting of the pressure-measuring plug with a wrench.

The hollow plug body 102 comprises distal end 102D and a proximal end 102P. The hollow plug body is provided with an external thread 102A for mounting the plug body 102 into a cylinder head of a combustion engine. The hollow plug body 102 has a plug body axis 102C. The plug body axis coincides with the longitudinal axis of the pressure measuring plug 100. A base part 110A of the housing 110 is attached to the distal end 102D of the hollow plug body 102 by welding. The housing further comprises a cap 110B which is provided with connector elements (not shown). The housing 110 is configured to accommodate electronic components 116 such as conditioning electronics and connector elements. The electronic circuitry or electronic components arranged to perform at least one of the following actions: temperature compensation of a signal obtained from the pressure sensor, i.e. piezo-resistive element, calibration of the signal obtained from the at least one electrical sensing element, internal fault detection, converting the electrical signal(s) from the at least one electrical sensing element to a conditioned measurement signal, i.e. a signal indicative of the pressure in the combustion chamber.

The sensing module 104 is arranged in the hollow plug body 102. The region in the hollow plug body occupied by the sensing module is indicated in FIG. 1 by A. The sensing module 104 is attached to the proximal end 102P of the hollow plug body. The sensing module is configured to measure pressure in a combustion chamber of an engine. The sensing module 104 comprises a first elongated circular body part 104B, a ring-shaped sensing structure 104A and a second elongated circular body part 104C. The first elongated circular body part 104B is attached at one end to the proximal end 102P of the hollow plug body 102 by welding and extends in the hollow plug body to position the ring-shaped sensing structure 104A at a distance from the proximal end of the hollow plug body and thus away from the combustion chamber. The ring-shaped sensing structure 104A is attached to the other end of the first elongated circular body part 104B.

At least one electrical sensing element (not shown) is arranged on a surface of the ring-shaped sensing structure facing away the combustion chamber. The at least one electrical sensing element could be in the form of strain gauges (e.g. silicon strain gauges such as micro-fused strain gauges (MSG)). The strain gauges are preferably piezo resistive sensing elements. The at least one electrical sensing element is configured to measure in use deformation of the ring-shaped sensing structure 104A due to pressure variations in the combustion chamber. The working principle of the sensing module is explained in more detail in patent application EP2138819 of applicant. The second elongated circular body part 104C is arranged in the first elongated circular body part 104B and coupled at one end to the ring-shaped sensing structure 104A. The second elongated circular body part 104C forms a space 104G for receiving a rod-like element. Examples of a rod-like element are but are not limited to: glow rod, temperature rod, and dummy rod.

A ring-shaped support 104D is attached to the outer circumference of the ring-shaped sensing structure 104A. A printed wiring board 104E is positioned on the ring-shaped support 104D. The ring-shaped support 104D is configured to position the printed wiring board (PWB) 104E at a minimal distance from the ring-shaped sensing structure 104A, so that forces acting on the printed wiring board in direction of the plug body axis be led to the outer circumference of the ring-shaped sensing structure 104A. In this way, distortion of the measured signal due to varying forces in the pressure-measuring plug is reduced significantly.

The sensing module 104 further comprises an alignment element 104F. The alignment element 104F forms the end of the sensing module 104 which is located in the hollow plug body 102. The alignment element 104F can be seen in more detail in FIG. 9 which shows a top view of the sensing module 104. The alignment element comprises an alignment structure 104F1 which will be described in more detail later. The alignment element 104F comprises a disc-shaped part with two larger openings 104F2. Each larger openings 104F2 extends above an electrical sensing element 104A1 which is attached to the ring-shaped sensing structure, the bonding wires 902 and parts of the PWB 104E. The bonding wires 902 electrically couple the electrical sensing element 104A1 to the PWB.

As described above, the sensing structure comprises an end in the hollow plug body which is a stack of the following elements: ring shaped sensing structure 104A, ring-shaped support 104D, PWB 104E and alignment element 104F. The alignment element 104F is mechanically coupled to the ring-shaped support 104D by coupling structures 104D1 of the ring-shaped support 104D. The coupling structures 104D1 are crushed in respective openings of the alignment element 104F. It might be clear that other coupling structures are possible to attach the alignment element to the ring-shaped support.

The alignment element 104F further comprises a central opening 106, and four smaller openings 104F3. Each of the four openings 104F3 is configured to guide flexible contacts of an interconnection structure to contact areas 104E1 of PWB 104E and to keep the flexible contacts in its position on the contact area.

The sensing module 104 is assembled as one part which is slit in the hollow plug body 102. In this way, the electrical sensing elements and the PWB are positioned at distance from the combustion chamber resulting less harsh operational conditions for the electronics in the plug body. A method of assembling a measuring plug comprises:

providing an assembly of sensing module and hollow plug body, a PWB of the sensing module is located at distance of an open end of the hollow plug body; and,
sliding the interconnection module in the hollow plug body to make an electrical connection between interconnection module and PWB of the sensing module.

The interconnection module 108 is configured to electrically connect the electronic components 116 in the cavity of the housing 110 to the PWB of the sensing module 104 through the hollow plug body 102. The region in the hollow plug body occupied by the interconnection module is indicated in FIG. 1 by B. The interconnection module 108 comprises an elongated support structure 108A with a proximal end 108P provided with first terminals 108C and a distal end 108D provided with second terminals 108B1. The first terminals 108C are spring type terminals in the form of helical compression springs having a spring axis which is parallel to the plug body axis (102C). The second terminals 108B1 are in the present embodiment press fit terminals. The second terminals 108B1 are electrically coupled to a PWB arranged in the housing 110 of the pressure-measuring plug 100.

The helical compression springs provide a flexible electrical connection in axial direction. Flexible electrical connection in the context of the present application means that the distance between two electrical components coupled by the connection may vary in time in a pressure measuring plug, or between several measuring plugs, wherein the electrical coupling between the two electrical components maintains reliable. A flexible electrical connection in axial direction allows using a material for the elongated support structure with a coefficient of thermal expansion which differs from the coefficient of thermal expansion of the hollow plug body. The difference in expansion is compensated by the flexible coupling. Furthermore, the flexible coupling in axial direction allows compensating variations in the length of the hollow plug body, interconnection module and sensing module.

The interconnection module 108 is slit in the hollow plug body through the opening at the distal end 102D of the hollow plug body. FIG. 2 shows a cross sectional view wherein the interconnection module is not in its final position in the hollow plug body. In the final position of the interconnection module, the first end of the elongated support structure 108P is lying against a protrusion 102E on the internal wall of the hollow plug body 102. In the present embodiment, the protrusion is a circular edge along the inner side of the hollow plug body 102. The protrusion 102E defines the axial position of the proximal end 108P of the interconnection module in the hollow plug body 102 and consequently the distance between proximal end 108P of the interconnection module 108 and the PWB 104E of the sensing module 104. The PWB 104E comprises a number of contact areas 104E1 which are in a plain perpendicular to the plug body axis. After inserting of the interconnection structure 108, the helical springs of the first terminals 108C are touching the number of contact areas. The use of the protrusion 102 limits the force of the helical spring terminals acting on the PWB of the sensing module 104. The coefficient of thermal expansion of the material of the elongated support structure and hollow plug body 102 might be different. The use of the protrusion reduces the influence of this with respect to the forces acting on the PWB of the sensing module by fixating the axial position of the interconnection module 108 in the hollow plug body.

The interconnection structure 108 further comprises a resilient O-ring 108E at a circular edge of the distal end 108D of the interconnection module 108. The distal end 108D is located at the distal end 102D of the hollow plug body 102. After the base part 110A of the housing 110 is attached to the distal end 102D of the plug body 102, the resilient O-ring 108E in combination with the protrusion 102E fixates the interconnection module in axial direction in the hollow plug body 102. The resilient O-ring 108E further enables to reduce the amount of stress in the elongated support structure 108A of the interconnection module 108 due to different coefficients of thermal expansion of the material of the elongated support structure and hollow plug body.

The sensing module 104 and interconnection module 108 comprises both a central passage which forms one through hole 106 from the cavity formed by the housing to the tip of the measuring plug. The through hole 106 is configured to receive a rod-like element such as but not limited to a glow rod, temperature sensing rod and dummy rod. Both the glow rod and temperature sensing rod require an electrical connection which is provided through the through hole 106.

The alignment element 104F of the sensing module 104 and the elongated support structure 108A of the connection module 108 comprise cooperating alignment structures 104F1, 108A2. The alignment structures are configured to align the interconnection module 108 with respect to the sensing structure 104 such that the terminals of the interconnection module 108 make electrical contact with the corresponding contact areas on the PWB of the sensing module. The alignment structure 104F1 of the alignment element 104F comprises two arrow-shaped structures with a tip pointing in the direction of the housing. The alignment structure 104F1 of the alignment element 104F is configured to protrude into a central hole at the proximal end 108P of the elongated support structure 108. The surface of the central hole has an arrow-shaped profile which forms the alignment structure 108A2A of the interconnection module 108. The profile of the alignment structure 108A2A comprises a tip pointing in the direction of the sensing module. FIG. 1 shows the aligned position of the sensing module and the interconnection module. FIG. 2 shows the situation wherein the tip of the alignment structure 108A2A of the interconnection module touches the tip of the alignment structure 104F1 of the sensing module. This situation could occur when the interconnection module is blind inserted in the hollow plug body. The alignment structure will force the interconnection structure while moving in the direction of the sensing structure to rotate around the plug body axis 102C. When the sensing module and interconnection module have the correct orientation with respect to each other, the interconnection module could be shifted in axial direction to the sensing module without rotation around the plug body axis until the proximal end of the interconnection module hits the protrusion 102E of the hollow plug body 102. The helical springs of the terminals 108C will be compressed in axial direction and touch the contact areas on the PWB of the sensing module 104. Thus the alignment structure of the sensing module and interconnection module is configured to rotate first the interconnection module to align the orientation of the modules after which the terminals of the interconnection module are moved in axial direction of the measuring plug to make electrical contact with the sensing module. The openings 104F3 of the alignment element 104F guide the terminals in the form of helical springs to the corresponding contact areas on the PWB. The openings 104F3 further ensure that the helical springs could not bend in axial direction after compression. Bending of the helical spring in axial direction could result in loss of contact with the contact area of the PWB.

FIGS. 3-8 show in more detail the interconnection module 108. FIG. 3 shows a side view of the interconnection module. The interconnection module 108 comprises conductive strip-like elements 108B. The strip-like elements 108B extends from the distal end 108D to the proximal end 108P the elongated support structure 108A. At the distal end 108D, the strip-like element 108B comprises a press fit terminal. At the proximal end 108P, the strip-like element 108B comprises a needle-like end 108B2 which forms a part of the terminal. The needle-like end 108B2 is pushed and fixated in the opening of a helical spring. FIG. 3 shows a side view of the interconnection module 108. The elongated support structure 108A, which could be made from a plastic material, comprises a first part 108A1 and a second part 108A2. The O-ring 108E is attached to the first part 108A1. FIG. 6 shows a top view of the interconnection module and FIG. 7 shows a bottom view of the interconnection module. It can be seen that interconnection module has a rotational symmetric structure. The terminals are rotational symmetric distributed around the longitudinal axis of the interconnection module. The distribution in the present embodiment is such that interconnection module has two possibilities to electronically connect the sensing module to the electronic components in the housing. FIGS. 6 and 7 shows further the central opening 106 which forms the passage from the housing to the tip of the measuring plug. FIG. 7 shows further the two tips of the alignment structure 108A2A and two recesses 108A2B for receiving the alignment structure of the sensing module. FIG. 7 further shows that the tip of the needle-like end 108B2 is inserted in the opening of the helical spring element 108C.

FIG. 8 is a sectional view of the interconnection module along the lines VIII-VIII in FIGS. 6 and 7. It should be noted that only one conductive strip-like element 108B is show. This figure shows that the elongated support structure 108A comprises longitudinal recesses 602 configured to receive the conductive strip-like elements 108B. The recesses 602 extend parallel to the plug body axis. A longitudinal recess 602 terminates at one end in a through hole 604 of the first part 108A1 at the distal end 108D) of the elongated support structure 108A. The longitudinal recess 602 terminates at the opposite end in a through hole of the second part 108A2. To fixate the stripe-like elements 108B in longitudinal direction in the elongated support structure both the elongated recesses 602 and stripe-like elements 108B comprises a structure which narrows in the direction of the ends of the elongated support structure 108.

The first part 108A1 and the second part 108A2 are coupled by means of a snap fitting. Reference numeral 108A1A indicates the snap fitting structure of the first part 108A1 and reference numeral 108A2A indicates the snap fitting structure of the second part 108A2 of the elongated support structure 108A.

The interconnection module 108 is assembles in the following way. First the four strip-like elements 108B are positioned in the recess of the first part. This is done by inserting the end of the stripe-like element with the press-fit terminal 108B1 through an opening in the section of the first part forming the distal end of the elongated support structure. Subsequently, the strip-like element is positioned in the recess 602. After this, the second part 108A2 is shifted over the needle-like ends of the stripe-like elements and snap fitted to the first part 108A1. Then, the helical spring elements 108C are attached to the needle-like ends of the conductive stripe-like elements. Finally, the resilient O-ring 108E is attached to the distal end of the elongated support structure 108A.

In an alternative way to assemble the interconnection module 108, the helical springs are positioned around the needle-like ends of the strip-like elements. The springs could be attached to the needle-like ends by clamping, welding or deformation of the springs. Then the four strip-like elements 108B are positioned in the recess of the first part. This is done by inserting the end of the stripe-like element with the press-fit terminal 108B1 through an opening in the section of the first part forming the distal end of the elongated support structure. Subsequently, the strip-like element is positioned in the recess 602. After this, the second part 108A2 is shifted or pushed over helical springs located at the needle-like ends of the stripe-like elements and snap fitted to the first part 108A1.

Preferably, an opening in the second part 108A2 has a slightly smaller cross section then a cross section of a helical spring. In this way, the helical springs are locked up in the openings of the second part 108A2 after insertion.

It should be noted that the assembly of elongated support structure and stripe-like elements could be obtained by an overmolding process.

Figure 10:
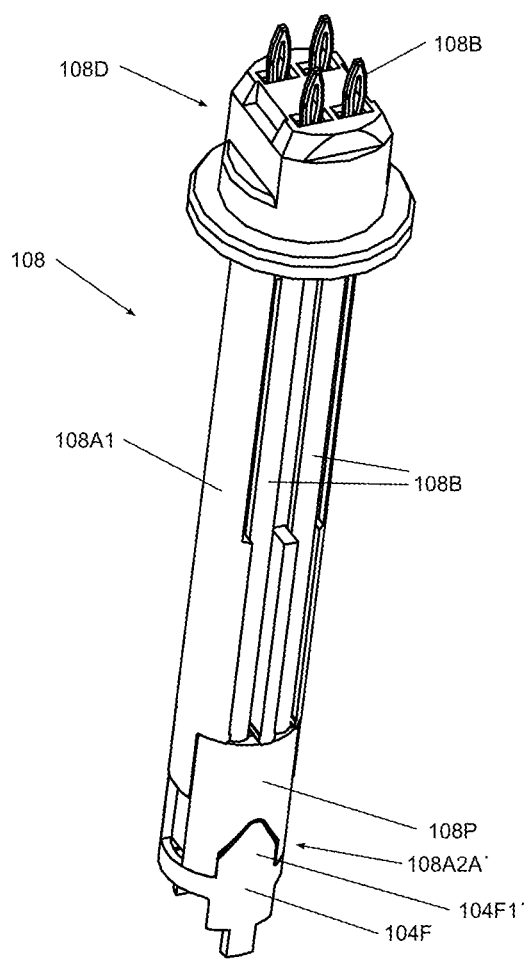
FIG. 10 shows schematically a second embodiment of an interconnection module; and, FIG. 11 shows schematically a third embodiment of an interconnection module.

FIG. 10 shows a perspective view of a second embodiment of an interconnection for use in a measuring plug. This embodiment differs from the previous described embodiment in that it does not comprise a central hole. This makes the embodiment suitable for a measuring plug which measures only the pressure in a space. Another difference is that the alignment structure 108A2A' of the interconnection module is located at the outer surface. The corresponding alignment element 104F with alignment structure 104F1' is also shown in FIG. 10. The resilient O-ring is not shown in this figure.

Figure 11:
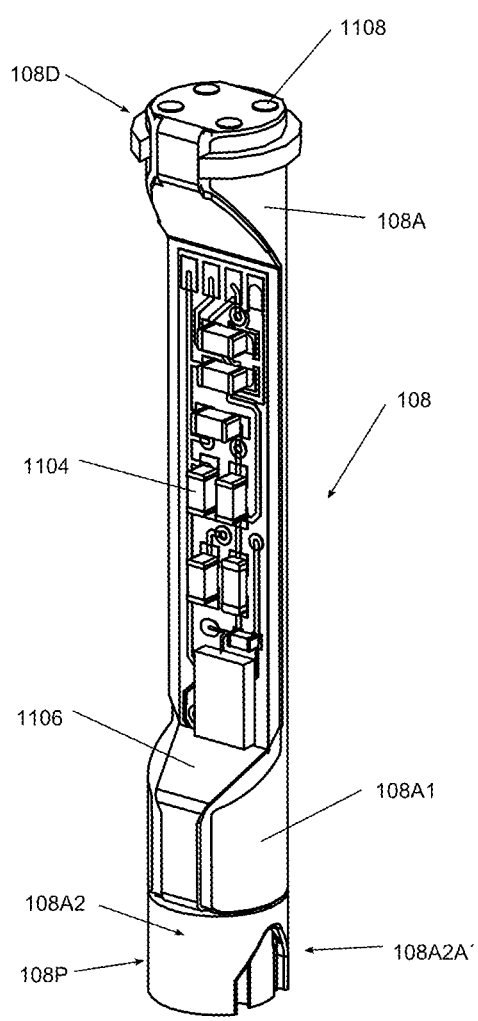

FIG. 11 shows a perspective view of a third embodiment of an interconnection module. In this embodiment, the interconnection module comprises electronic circuitry 1104. The electronic circuitry could be arranged to condition the electronic signals generated by the electronic sensing elements of the sensing module. At the distal end 108D of the interconnection module, contact areas 1108 are provided. Spiral contact springs attached to a PWB in the housing 1106 could be used to make the electrical connection between electrical components in the housing and the circuitry on the interconnection module. In this embodiment, the alignment structure 108A2A' of the interconnection module 108 at the proximal end 108P is at the outer surface of the elongated support structure 108A.

In the embodiments described above helical spring elements are used to make the electrical connection between interconnection module and sensing module. Other spring type terminals could be used to make the connection, for example connection with leaf spring elements. The flexible coupling in axial direction could also be provided by a flexible conductive O-ring or tip part which is attached to a terminal of the interconnection module. A flexible conductive material is for example a conductive elastomer. It might also be possible to use press fit terminals to make the electrical connection between interconnection module and sensing module. However, if press fit terminals are used; the connection at the other side of the interconnection module should have a flexible coupling in axial direction of the plug body.

Described is a design of an interconnection system to separate the electrical sensing element from the signal conditioning electronic circuitry over a relative long distance. In this way, the electronic circuitry is protected for thermal overload. The interconnection system withstands the automotive engine cylinder temperature and vibrations and is suitable for high volume assembly and common processes. The interconnection structure 108 meets the automotive temperature and vibration requirements. The design is applicable for different lengths a variety of engine head lay-outs and other measuring plug sensors wherein the sensor is located at one end of the plug body and the conditioning sensor electronics is located at the other end of the plug body.

The press fit terminals at the distal end of the interconnection module guarantee easy assembly for mass production. The proximal end of the interconnection module has helical spring elements which will touch contact areas of a PWB which is attached to a support ring. The interconnection module is designed in this way that blind insertion is possible for easy assembly during mass-production as it aligns with an alignment feature integrated in the end part of the sensing module. The interconnection module enables ceramic integration due to its high temperature resistance.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the idea of the invention.

The invention claimed is:

1. A measuring plug comprising:
   a hollow plug body having a proximal end, a distal end, and a plug body axis;
   a housing attached to the distal end of the plug body;
   one or more electronic components arranged in the housing;
   a sensing module arranged in the hollow plug body, the sensing module having at least one electrical sensing element and a printed wiring board (PWB) electrically coupled to the at least one electrical sensing element, the PWB having one or more contact areas which are in a plane perpendicular to the plug body axis, the sensing module being attached to the proximal end of the hollow plug body; and
   an interconnection module configured to electrically connect the electronic components to the sensing module through the hollow plug body, the interconnection module having an elongated support structure with a first end provided with first terminals touching the one or more contact areas and a second end provided with second terminals, the first terminals providing an electrical coupling that is flexible in an axial direction.

2. The measuring plug of claim 1, wherein the first terminals are spring type terminals.

3. The measuring plug of claim 2, wherein each spring type terminal includes a helical compression spring.

4. The measuring plug of claim 3, wherein the helical compression spring comprises a spring axis which is parallel to the plug body axis.

5. The measuring plug of claim 1, wherein the PWB is located between the at least one electrical sensing element and an alignment element, and wherein the sensing module includes the alignment element, and wherein the alignment element and an end of the elongated support structure include cooperating alignment structures configured to align the interconnection module with respect to the PWB.

6. The measuring plug of claim 5, wherein the alignment structure of the alignment element includes two or more arrow-shaped structures having a tip pointing in a direction of the housing.

7. The measuring plug of claim 1, wherein the interconnection module includes conductive strip-like elements, a first end of the strip-like elements forming at least a part of a first terminal and a second end of the strip-like elements forming a second terminal, the elongated support structure having longitudinal recesses parallel to the plug body axis and configured to receive the strip-like elements.

8. The measuring plug of claim 7, wherein a longitudinal recess terminates in a through hole at an end of the elongated support structure, and both the elongated recesses and stripe-like elements include a structure which narrows in the direction of the distal end.

9. The measuring plug of claim 1, wherein the interconnection module has a rotational symmetric structure.

10. The measuring plug of claim 1, wherein the interconnection module has been obtained by an overmolding process.

11. The measuring plug of claim 1, wherein the hollow plug body internally includes a protrusion which defines a position of an end of the interconnection module in the hollow plug body.

12. The measuring plug of claim 11, wherein the interconnection module further comprises a resilient O-ring at an end of the interconnection module located at the distal end of the hollow plug body.

13. The measuring plug of the claim 1, wherein the sensing module and the interconnection module include a central through hole configured for passing through the hollow plug body an electrical connection of an electrical element attached to the sensing module.

14. The measuring plug of claim 13, wherein the electrical element is a glow rod and the sensing module is configured to measure pressure in a combustion chamber.

* * * * *